Patented June 27, 1933

1,915,301

UNITED STATES PATENT OFFICE

GEORGE R. ENSMINGER, OF NEW BRUNSWICK, NEW JERSEY, ASSIGNOR TO E. I. DU PONT DE NEMOURS & COMPANY, OF WILMINGTON, DELAWARE, A CORPORATION OF DELAWARE

WATER-REPELLENT COATING COMPOSITION

No Drawing. Application filed November 6, 1931. Serial No. 573,515.

This invention relates to water-repellent coating compositions and more particularly to such coating compositions designed for use on fabrics, paper, and similar fibrous bases.

Heretofore many water-repellent coating compositions for use on fabrics, and the like, have been known, but fabrics coated or impregnated with such compositions have always had some material drawback. Although some of these compositions had several desirable properties, a composition has not heretofore been known that, when applied to a fabric, would give a fabric having a high degree of water-repellency without altering the appearance of the fabric or its inherent pliability, softness, and suppleness, in other words, a fabric substantially unchanged in any manner except that it was highly water-repellent. Many of these compositions of the prior art had an objectionable inherent odor or developed such an odor on ageing, or had a tendency to discolor.

An object of the present invention is to provide a coating composition which, when applied to a fabric, or the like, will give the fabric excellent water-repellent properties without otherwise altering the fabric. A further object is to provide such a composition which is substantially odorless and has no tendency to develop an objectionable odor on ageing, or to become discolored. A particular object of this invention is to provide such a composition that will not decrease the suppleness or pliability of the fabric, as the compositions heretofore known have generally done.

The above objects are accomplished according to the present invention by the utilization of a composition comprising a cellulose derivative, preferably cellulose nitrate, a water-repellent wax, and a non-volatile oil, with or without the addition of a plasticizer for the cellulose derivative, dissolved in a suitable solvent mixture.

Throughout the specification and claims, the viscosity of the cellulose nitrate is expressed in seconds determined according to A. S. T. M. Tentative Specifications Designation D—301—31T, Formula A (12.2% solution).

The following examples are given to illustrate two formulas coming within the scope of the present invention:

*Example 1.*—Use of high melting paraffin wax and plasticizer for the cellulose nitrate

|  | Per cent |
| --- | --- |
| Nitrocotton (15–20 seconds) | 1.0 |
| High melting paraffin wax | 4.0 |
| "Petrolatum" (naphthene base oil) | 6.0 |
| Butyl stearate | 2.0 |
| Butyl acetate | 4.0 |
| Ethyl acetate | 25.0 |
| Gasoline | 13.0 |
| Toluol | 40.0 |
| Ethanol (denatured) | 5.0 |
|  | 100.0 |

*Example 2.*—Use of Japan wax and no plasticizer for the cellulose nitrate

|  | Per cent |
| --- | --- |
| Nitrocotton (15–20 seconds) | 1.0 |
| Japan wax | 3.0 |
| "Petrolatum" (naphthene base oil) | 3.0 |
| Toluol | 30.0 |
| Ethyl acetate | 33.0 |
| Butyl acetate | 30.0 |
|  | 100.0 |

The compositions of the above examples are prepared by a simple mixing operation. Preferably the wax is added to the toluol in a mixer and agitated until dissolved, and the cellulose nitrate is separately dissolved in the ester solvents and alcohol, the other materials then being added to the nitrocellulose solution, which is then combined with the wax solution.

The above examples are given merely to illustrate specific embodiments of the invention, and it will be understood that the ingredients and proportions of the above compositions may be widely varied without departing from the scope of the present invention.

In these coating compositions the cellulose derivative, preferably cellulose nitrate, although other cellulose derivatives, such as cellulose acetate, benzyl and ethyl cellulose, may be used, increases the water-repellency of the wax and non-volatile oil mixture, probably due to the fact that the cellulose derivative holds the composition on the surface of the fibers of the material treated. It is preferable to use a cellulose nitrate having a viscosity above four seconds and the best results have been obtained with a cellulose nitrate having a viscosity of 15–20 seconds in treating relatively fine fabrics, such as silks, et cetera. Where the fabric to be treated is relatively heavy, such as canvas, and duck, a higher viscosity cellulose nitrate, having a viscosity of the order of 1000 seconds, has been found more suitable. Various kinds of cellulose nitrate, such as colloidal nitrocotton, film scrap, smokeless gun powder, and celluloid, may be used in place of the ordinary nitrated cotton disclosed in the above examples.

The wax in these compositions gives increased water-repellency to fabrics treated with the compositions. Obviously a wide variety of waxes may be used, but the brittle, non-tacky, high melting paraffin waxes are preferred. Japan wax and also hydrogenated sperm oil are particularly well suited for this purpose. Other waxes, such as ceresin, candelilla, Chinese insect, bayberry, montan, glyceril stearate, and glycol stearate, may be used.

The non-volatile oil in these compositions is important in obtaining a composition that will not stiffen fabric. Apparently the oil functions as a softener for the wax. A non-volatile naphthene base oil, such as "Petrolatum", gives excellent results, although many other oils, such as neat's-foot, olive, cottonseed, castor, blown cottonseed, boiled linseed, paraffin, "Nujol", and heavy petroleum oils, are suitable. Oleic acid and lanolin have also been used with success.

As will be apparent to those skilled in the art, the solvent mixture used in these compositions can be varied widely and the examples merely illustrate typical solvent mixtures. The usual cellulose derivative solvents and diluents and the usual wax solvents may be employed in widely varying proportions.

In order to obtain maximum pliability and absence of harshness of a fabric treated with the compositions according to the present invention, a plasticizer for the cellulose derivative should be used. Where cellulose nitrate is used, it is preferred to employ a plasticizer such as butyl stearate or ethoxy ethyl stearate. Other well known plasticizers of cellulose nitrate, such a dibutyl phthalate and tricresyl phosphate, may be used, but the plasticizers of the stearate type are preferred since they serve to increase the water-repellent properties of the compositions, as well as imparting pliability and softness to fabrics treated with the compositions.

The proportion of non-volatiles in these compositions should not exceed 20% by weight, and it is rather impractical to use less than 1% by weight of non-volatiles. By the term "non-volatiles" as used herein is meant the cellulose derivative, the wax, the non-volatile oil and the plasticizer for the cellulose derivative. It will be understood that it is not intended to exclude oils which are substantially non-volatile but do volatilize to a certain extent. The proportion of wax, plus non-volatile oil, to cellulose derivative preferably should be kept between 2–15 parts by weight to one part by weight of the cellulose derivative, and the proportion of non-volatile oil to wax preferably about 1 to 1, or an excess of oil. In treating various fabrics and employing different specific ingredients some variations in the proportions given above may be found more suitable for certain purposes, but the preferred proportions are as above indicated.

The compositions of the present invention may be applied to fabrics by a number of known methods but it is preferred to apply these compositions simply by immersing the fabric, or paper, or material to be treated until it is thoroughly saturated and then wringing out the excess coating material by squeeze rolls or centrifuging. This process is conducted at room temperature generally, although in using the composition specifically disclosed in Example 1, it is preferred to carry out the process at a temperature not lower than 73° F., since there is some tendency for the high melting paraffin wax to precipitate out if the operating temperature is below 73° F. In the case of the composition specifically disclosed in Example 2, it is not necessary to observe this temperature requirement since the Japan wax does not show any tendency to precipitate out. After the excess coating material has been removed the volatile solvents of the composition are then removed by drying the fabric, or paper, at ordinary or slightly elevated temperatures.

Fabrics treated with the coating compositions of the present invention are highly water-repellent and substantially unaltered in appearance or feel. In fact, in many cases the pliability and softness of the fabric appears to be actually increased by treatment with these compositions. Fabric so treated is substantially odorless and does not have any tendency to become discolored on ageing. The coating composition being substantially chemically inert with respect to the fabric, has no deleterious effect thereon. It is believed that the superiority of the present compositions over those heretofore used lies, to some extent at least, in the fact that the coating composition surrounds each fiber of the fabric without bridging over the interstices of the fabric, this bridging over apparently being one of the main causes of the increased stiffness of fabric treated by processes heretofore known.

Usually in the heretofore known processes for waterproofing fabric, a composition has been applied to the fabric by means of a doctor knife which has a tendency to cause this bridging over of the interstices in the fabric.

The low non-volatile content of the present compositions permits easy penetration of the fibers of the fabric well beneath the surface, thus affording uniform and complete coating of each individual fiber, which results in a high degree of water-repellency without increasing the stiffness or altering the feel of the fabric.

These compositions find particular use where it is desired to treat all varieties of fabrics to give them the property of water-repellency without altering their inherent appearance and feel. Silks, woolens, cotton fabrics, velvets, rayon, paper, and the like, may be successfully treated with these compositions, as well as the heavier fabrics, such as tarpaulin, canvas, duck, and teal.

As many apparently widely different embodiments of this invention may be made without departing from the spirit and scope thereof, it is to be understood that the invention is not limited to the specific embodiments thereof except as defined in the appended claims.

I claim:

1. A water-repellent coating composition for fabrics and the like comprising a cellulose derivative, a water-repellent wax, and a non-volatile oil, the amount of wax and oil together being at least equal to twice the amount of cellulose derivative employed and the amount of oil being at least equal to the amount of wax employed, the non-volatile ingredients amounting to 1–20% by weight of the composition.

2. A water-repellent coating composition for fabrics and the like comprising cellulose nitrate, a water-repellent wax, and a non-volatile oil, the amount of wax and oil together being at least equal to twice the amount of cellulose nitrate employed and the amount of oil being at least equal to the amount of wax employed, the non-volatile ingredients amounting to 1–20% by weight of the composition.

3. A water-repellent coating composition for fabrics and the like comprising cellulose nitrate, a high melting paraffin wax, a non-volatile oil, and a plasticizer for the cellulose nitrate, the amount of wax and oil together being at least equal to twice the amount of cellulose nitrate employed and the amount of oil being at least equal to the amount of wax employed, the non-volatile ingredients amounting to 1–20% by weight of the composition.

4. A water-repellent coating composition for fabrics and the like comprising cellulose nitrate, a high melting paraffin wax, a non-volatile naphthene base oil, and a plasticizer for the cellulose nitrate, the amount of wax and oil together being at least equal to twice the amount of cellulose nitrate employed and the amount of oil being at least equal to the amount of wax employed, the non-volatile ingredients amounting to 1–20% by weight of the composition.

5. A water-repellent coating composition for fabrics and the like comprising cellulose nitrate having a viscosity of at least 4 seconds, a brittle, non-tacky, high melting paraffin wax, a non-volatile naphthene base oil, and a plasticizer of the stearate type for the cellulose nitrate, the amount of wax and oil together being at least equal to twice the amount of cellulose nitrate employed and the amount of oil being at least equal to the amount of wax employed, the non-volatile ingredients amounting to 1–20% by weight of the composition.

6. A water-repellent coating composition for fabrics and the like comprising a cellulose derivative, a water-repellent wax, and a non-volatile oil, the amount of wax and oil together being equal to 2–15 times the amount of cellulose derivative employed and the amount of oil being at least equal to the amount of wax employed, the non-volatile ingredients amounting to 1–20% by weight of the composition.

7. A water-repellent coating composition for fabrics and the like comprising cellulose nitrate, a water-repellent wax, and a non-volatile oil, the amount of wax and oil together being equal to 2–15 times the amount of cellulose nitrate employed and the amount of oil being at least equal to the amount of wax employed, the non-volatile ingredients amounting to 1–20% by weight of the composition.

8. A water-repellent coating composition for fabrics and the like comprising cellulose nitrate, a high melting paraffin wax, a non-volatile oil, and a plasticizer for the cellulose nitrate, the amount of wax and oil together being equal to 2–15 times the amount of cellulose nitrate employed and the amount of oil being at least equal to the amount of wax employed, the non-volatile ingredients amounting to 1–20% by weight of the composition.

9. A water-repellent coating composition for fabrics and the like comprising cellulose nitrate, a high melting paraffin wax, a non-volatile naphthene base oil, and a plasticizer for the cellulose nitrate, the amount of wax and oil together being equal to 2–15 times the amount of cellulose nitrate employed and the amount of oil being at least equal to the amount of wax employed, the non-volatile ingredients amounting to 1-20% by weight of the composition.

10. A water-repellent coating composition for fabrics and the like comprising cellulose nitrate having a viscosity of at least 4 seconds, a brittle, non-tacky, high melting paraffin wax, a non-volatile naphthene base oil, and a plasticizer of the stearate type for the cellulose nitrate, the amount of wax and oil together being equal to 2-15 times the amount of cellulose nitrate employed and the amount of oil being at least equal to the amount of wax employed, the non-volatile ingredients amounting to 1-20% by weight of the composition.

In testimony whereof I affix my signature.
GEORGE R. ENSMINGER.

CERTIFICATE OF CORRECTION.

Patent No. 1,915,301.　　　　　　　　　　　　　　　　June 27, 1933.

GEORGE R. ENSMINGER.

It is hereby certified that error appears in the printed specification of the above numbered patent requiring correction as follows: Page 2, line 18, for "colloidal" read "colloided"; and line 61, for "a" read "as"; and that the said Letters Patent should be read with these corrections therein that the same may conform to the record of the case in the Patent Office.

Signed and sealed this 22nd day of August, A. D. 1933.

M. J. Moore.

(Seal)　　　　　　　　　　　　　　　　　　　　Acting Commissioner of Patents.

the amount of wax employed, the non-volatile ingredients amounting to 1-20% by weight of the composition.

10. A water-repellent coating composition for fabrics and the like comprising cellulose nitrate having a viscosity of at least 4 seconds, a brittle, non-tacky, high melting paraffin wax, a non-volatile naphthene base oil, and a plasticizer of the stearate type for the cellulose nitrate, the amount of wax and oil together being equal to 2-15 times the amount of cellulose nitrate employed and the amount of oil being at least equal to the amount of wax employed, the non-volatile ingredients amounting to 1-20% by weight of the composition.

In testimony whereof I affix my signature.
GEORGE R. ENSMINGER.

CERTIFICATE OF CORRECTION.

Patent No. 1,915,301. June 27, 1933.

GEORGE R. ENSMINGER.

It is hereby certified that error appears in the printed specification of the above numbered patent requiring correction as follows: Page 2, line 18, for "colloidal" read "colloided"; and line 61, for "a" read "as"; and that the said Letters Patent should be read with these corrections therein that the same may conform to the record of the case in the Patent Office.

Signed and sealed this 22nd day of August, A. D. 1933.

M. J. Moore.

(Seal) Acting Commissioner of Patents.

CERTIFICATE OF CORRECTION.

Patent No. 1,915,301.                                                June 27, 1933.

GEORGE R. ENSMINGER.

It is hereby certified that error appears in the printed specification of the above numbered patent requiring correction as follows: Page 2, line 18, for "colloidal" read "colloided"; and line 61, for "a" read "as"; and that the said Letters Patent should be read with these corrections therein that the same may conform to the record of the case in the Patent Office.

Signed and sealed this 22nd day of August, A. D. 1933.

M. J. Moore.

(Seal)                                                          Acting Commissioner of Patents.